(12) United States Patent
Chu et al.

(10) Patent No.: US 11,916,289 B2
(45) Date of Patent: Feb. 27, 2024

(54) FOLDABLE TERMINAL DEVICE

(71) Applicant: Huawei Technologies Co., Ltd., Shenzhen (CN)

(72) Inventors: Jiahui Chu, Shanghai (CN); Dong Yu, Shanghai (CN); Meng Hou, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 345 days.

(21) Appl. No.: 17/439,178

(22) PCT Filed: Mar. 7, 2020

(86) PCT No.: PCT/CN2020/078321
§ 371 (c)(1),
(2) Date: Sep. 14, 2021

(87) PCT Pub. No.: WO2020/187066
PCT Pub. Date: Sep. 24, 2020

(65) Prior Publication Data
US 2022/0166132 A1 May 26, 2022

(30) Foreign Application Priority Data

Mar. 15, 2019 (CN) .......................... 201910199761.7

(51) Int. Cl.
*H01Q 1/52* (2006.01)
*H04B 1/00* (2006.01)
(Continued)

(52) U.S. Cl.
CPC .......... *H01Q 1/521* (2013.01); *H04B 1/0064* (2013.01); *H04M 1/0214* (2013.01); *H01Q 1/243* (2013.01)

(58) Field of Classification Search
CPC ............ H01Q 1/243; H01Q 1/24; H01Q 1/48; H01Q 21/28; H01Q 1/38; H01Q 1/44; H01Q 1/46; H01Q 5/30; H01Q 9/42; H01Q 1/22; H01Q 1/2266; H01Q 1/242; H01Q 1/273; H01Q 13/10; H01Q 19/17; H01Q 21/06; H01Q 3/30; H01Q 5/15; H01Q 5/35; H01Q 5/378; H01Q 5/385; H01Q 5/40;
(Continued)

(56) References Cited

U.S. PATENT DOCUMENTS

2005/0012669 A1  1/2005  Ide
2005/0277398 A1  12/2005  Son
(Continued)

FOREIGN PATENT DOCUMENTS

CN  1577961 A  2/2005
CN  101796688 A  8/2010
(Continued)

*Primary Examiner* — Monica C King
(74) *Attorney, Agent, or Firm* — Conley Rose, P.C.

(57) ABSTRACT

A foldable terminal device includes a feed source, a first part, and a second part. The first part is configured with a first antenna element that is fed by the first feed source. The second part is configured with a second antenna element that is coupled to the first antenna element for coupled feeding when the foldable terminal device is folded. An operating frequency band of the second antenna element includes an operating frequency band of the first antenna element.

20 Claims, 6 Drawing Sheets

(51) Int. Cl.
*H04M 1/02* (2006.01)
*H01Q 1/24* (2006.01)

(58) Field of Classification Search
CPC ....... H01Q 9/0442; H01Q 9/26; H04M 1/026; H04M 1/0268; H04M 1/0214; H04M 1/0216; H04M 1/02; H04M 1/0235; H04M 1/72454; H04M 1/725; G09F 9/301; H04B 1/005; H04B 7/0413
See application file for complete search history.

(56) References Cited

U.S. PATENT DOCUMENTS

| | | | |
|---|---|---|---|
| 2010/0171676 A1 | 7/2010 | Tani et al. | |
| 2012/0026048 A1* | 2/2012 | Vazquez | H01Q 1/38 343/725 |
| 2013/0135154 A1 | 5/2013 | Sumi | |
| 2017/0033434 A1 | 2/2017 | Hong et al. | |
| 2017/0110786 A1 | 4/2017 | Liu | |
| 2017/0237175 A1* | 8/2017 | Alu | H01P 3/003 343/771 |
| 2018/0287253 A1* | 10/2018 | Apostolos | H01Q 1/2291 |
| 2019/0148837 A1* | 5/2019 | Haven | H01Q 13/10 343/702 |
| 2023/0283698 A1* | 9/2023 | Wang | H01Q 1/243 361/679.01 |
| 2023/0318180 A1* | 10/2023 | Lan | H01Q 5/385 343/702 |

FOREIGN PATENT DOCUMENTS

| | | |
|---|---|---|
| CN | 104199326 A | 12/2014 |
| CN | 106033841 A | 10/2016 |
| CN | 106165195 A | 11/2016 |
| CN | 108292796 A | 7/2018 |
| CN | 108933325 A | 12/2018 |
| CN | 109193117 A | 1/2019 |
| CN | 109361062 A | 2/2019 |
| CN | 109449569 A | 3/2019 |
| CN | 111613873 A | 9/2020 |
| EP | 3920327 A1 | 12/2021 |
| WO | 2012020553 A1 | 2/2012 |

\* cited by examiner

FOLDABLE TERMINAL DEVICE

CROSS-REFERENCE TO RELATED APPLICATIONS

This is a National Stage of International Patent Application No. PCT/CN2020/078321 filed on Mar. 7, 2020, which claims priority to Chinese Patent Application No. 201910199761.7 filed on Mar. 15, 2019. Both of the aforementioned applications are hereby incorporated by reference in their entireties.

TECHNICAL FIELD

This application relates to the field of electronic devices, and more specifically, to a foldable terminal device.

BACKGROUND

As usage scenarios of a terminal device continuously increase, structure types of the terminal device begin to increase. The most common structure types are bar-type terminal devices and foldable terminal devices. Designs of antennas in the terminal device vary according to the structure types of the terminal device.

The foldable terminal device has two parts that are relatively movable (for example, relatively sliding and relatively rotating). For example, one part 1 may rotate relative to a side of another part 2. For another example, one part may slide on a surface of another part. Therefore, the foldable terminal device may have a bar-type mode in which a cover is opened and a folded mode in which a cover is closed. For example, the foldable terminal device includes the part 1 and the part 2. After the part 1 rotates relative to one end of the part 2, a surface of the part 1 is in contact with and coincides with a surface of the part 2, and the two surfaces cannot be exposed. In this case, the foldable terminal device is in the folded mode in which the cover is closed. However, after the part 1 rotates relative to one end of the part 2, the two surfaces are no longer in contact and are exposed. In this case, the foldable terminal device may be in the bar-type mode in which the cover is opened. For another example, the foldable terminal device includes a part 3 and a part 4. After the part 3 slides on the part 4, a projection area that is of a surface of the part 3 and that is on the part 4 coincides with a surface of the part 4. In this case, the foldable terminal device is in the folded mode in which the cover is closed. However, after the part 3 slides on the part 4, the projection area no longer coincides with the surface of the part 4. In this case, the foldable terminal device may be in the bar-type mode in which the cover is opened.

However, in the two modes, use performance of antennas that are of the two relatively movable parts and that have different relative positions and a same operating frequency band is likely to change. This affects stability of antenna signals. To ensure stable use of an antenna in the two modes, a plurality of antennas with a same operating frequency band usually need to be disposed on the two relatively movable parts of the terminal device. Therefore, antenna arrangement and connection methods become complex.

SUMMARY

This application provides a foldable terminal device, to provide a foldable terminal device with a simple structure and high antenna performance.

According to a first aspect, a foldable terminal device is provided, including a first feed source, and a first part and a second part that are foldable. The first part is configured with a first antenna element that is fed by the first feed source. The second part is configured with a second antenna element that is coupled to the first antenna element for coupled feeding when the foldable terminal device is folded. An operating frequency band of the second antenna element includes an operating frequency band of the first antenna element.

In this embodiment of this application, when the foldable terminal device is in a folded mode, the second part is relatively close to the first part, and an electronic element disposed in the second part affects an electronic element disposed in the first part. This application uses such impact in a way that the second antenna element disposed in the second part and the first antenna element disposed in the first part are coupled for feeding and operate in a same frequency band. In this way, signal interference caused by a distance change can be avoided, and use performance of antennas can be improved. Because the first antenna element and the second antenna element are not directly electrically connected by using a conducting wire, but are electrically connected in a coupling manner, existence of the second antenna element does not additionally introduce a problem of wiring difficulty.

With reference to the first aspect, in some implementations of the first aspect, the first antenna element includes: a first antenna radiator, including a first connection point and a second connection point. The first connection point of the first antenna radiator is grounded, and the second connection point of the first antenna radiator is electrically connected to the first feed source. The second antenna element includes: a second antenna radiator, configured to couple to the first antenna radiator for coupled feeding when the foldable terminal device is folded, and including a third connection point and a fourth connection point, where both the third connection point of the second antenna radiator and the fourth connection point of the second antenna radiator are grounded; and a first tuning element, electrically connected between a ground and the third connection point of the second antenna radiator, and configured to adjust the operating frequency band of the second antenna element to include the operating frequency band of the first antenna element.

When the first antenna element and the second antenna element are coupled for feeding, the operating frequency band of the second antenna element may be slightly different from the operating frequency band of the first antenna element, and a coincidence degree between the operating frequency band of the second antenna element and the operating frequency band of the first antenna element does not meet a requirement. The operating frequency band of the second antenna element is adjusted by using a tuning element, so that coupling feeding efficiency between the first antenna radiator and the second antenna radiator can be improved.

With reference to the first aspect, in some implementations of the first aspect, when the foldable terminal device is folded, a distance between the first connection point of the first antenna radiator and the third connection point of the second antenna radiator is less than a first preset threshold, and a distance between the second connection point of the first antenna radiator and the fourth connection point of the second antenna radiator is less than a second preset threshold; or a distance between the first connection point of the first antenna radiator and the fourth connection point of the second antenna radiator is less than the first preset threshold, and a distance between the second connection point of the first antenna radiator and the third connection point of the second antenna radiator is less than the second preset threshold.

A distance between the first antenna radiator and the second antenna radiator is relatively close, so that coupling feeding efficiency between the first antenna radiator and the second antenna radiator can be improved.

With reference to the first aspect, in some implementations of the first aspect, the first part includes a first frame, and the second part includes a second frame; and the first antenna element is disposed around the first frame, the second antenna element is disposed around the second frame, and when the foldable terminal device is folded, the first frame and the second frame are located on a same side of the foldable terminal device.

The first antenna element and the second antenna element are disposed on the same side of the foldable terminal device, so that coupling feeding efficiency between the first antenna radiator and the second antenna radiator can be improved.

With reference to the first aspect, in some implementations of the first aspect, the first antenna radiator is the first frame, and the second antenna radiator is the second frame.

By using a frame as an antenna radiator, a structure of the foldable terminal device can be simplified.

With reference to the first aspect, in some implementations of the first aspect, the foldable terminal device further includes a second feed source, and the first antenna element is fed by the first feed source and the second feed source. The first antenna element includes: a first antenna radiator, including a first connection point and a second connection point. The first connection point of the first antenna radiator is electrically connected to the second feed source, and the second connection point of the first antenna radiator is electrically connected to the first feed source. The second antenna element includes: a second antenna radiator, configured to couple to the first antenna radiator for coupled feeding, and including a third connection point and a fourth connection point, where both the third connection point of the second antenna radiator and the fourth connection point of the second antenna radiator are grounded; and a first tuning element, electrically connected between a ground and the third connection point of the second antenna radiator, and configured to adjust the operating frequency band of the second antenna element to include the operating frequency band of the first antenna element.

When the first antenna element and the second antenna element are coupled for feeding, the operating frequency band of the second antenna element may be slightly different from the operating frequency band of the first antenna element, and a coincidence degree between the operating frequency band of the second antenna element and the operating frequency band of the first antenna element does not meet a requirement. The operating frequency band of the second antenna element is adjusted by using a tuning element, so that coupling feeding efficiency between the first antenna radiator and the second antenna radiator can be improved.

With reference to the first aspect, in some implementations of the first aspect, when the foldable terminal device is folded, a distance between the first connection point of the first antenna radiator and the third connection point of the second antenna radiator is less than a first preset threshold, and a distance between the second connection point of the first antenna radiator and the fourth connection point of the second antenna radiator is less than a second preset threshold; or a distance between the first connection point of the first antenna radiator and the fourth connection point of the second antenna radiator is less than the first preset threshold, and a distance between the second connection point of the first antenna radiator and the third connection point of the second antenna radiator is less than the second preset threshold.

A distance between the first antenna radiator and the second antenna radiator is relatively close, so that coupling feeding efficiency between the first antenna radiator and the second antenna radiator can be improved.

With reference to the first aspect, in some implementations of the first aspect, the first part includes a first frame, and the second part includes a second frame; and the first antenna element is disposed around the first frame, the second antenna element is disposed around the second frame, and when the foldable terminal device is folded, the first frame and the second frame are located on a same side of the foldable terminal device.

The first antenna element and the second antenna element are disposed on the same side of the foldable terminal device, so that coupling feeding efficiency between the first antenna radiator and the second antenna radiator can be improved.

With reference to the first aspect, in some implementations of the first aspect, the first antenna radiator is the first frame, and the second antenna radiator is the second frame.

By using a frame as an antenna radiator, a structure of the foldable terminal device can be simplified.

With reference to the first aspect, in some implementations of the first aspect, the first antenna element is fed by the first feed source and operates on a first frequency band. The foldable terminal device further includes: a third feed source, where the first antenna element is fed by the third feed source and operates on a second frequency band; a first filtering element, electrically connected between the first feed source and the first antenna element, and configured to filter a signal of the second frequency band; and a second filtering element, electrically connected between the third feed source and the first antenna element, and configured to filter a signal of the first frequency band.

A filter is configured to filter a signal of a specific frequency band, to avoid interference between different frequency bands, so that the first antenna element can operate in a plurality of frequency bands.

With reference to the first aspect, in some implementations of the first aspect, the foldable terminal device further includes: a second tuning element, electrically connected to the first antenna element, and configured to adjust the second frequency band.

A tuning element may enable the first antenna element to multiplex a plurality of antennas, so that the first antenna element can operate in a plurality of frequency bands.

With reference to the first aspect, in some implementations of the first aspect, the second antenna element is coupled to and fed by the first antenna element and operates on a third frequency band, and the third frequency band is the same as the first frequency band. The foldable terminal device further includes: a fourth feed source, where the second antenna element is fed by the fourth feed source and operates on a fourth frequency band; a third filtering element, electrically connected between the ground and the second antenna element, and configured to filter a signal of the fourth frequency band; and a fourth filtering element, electrically connected between the fourth feed source and the second antenna element, and configured to filter a signal of the third frequency band.

The filter is configured to filter a signal of a specific frequency band, to avoid interference between different frequency bands, so that the second antenna element can operate in a plurality of frequency bands.

With reference to the first aspect, in some implementations of the first aspect, the foldable terminal device further includes: a third tuning element, electrically connected to the second antenna element, and configured to adjust the fourth frequency band.

The tuning element may enable the second antenna element to multiplex a plurality of antennas, so that the second antenna element can operate in a plurality of frequency bands.

With reference to the first aspect, in some implementations of the first aspect, when the foldable terminal device is unfolded, the first antenna element is fed by the first feed source and operates on the first frequency band; and the second antenna element does not operate or operates on another frequency band different from the first frequency band.

When a distance between the first antenna element and the second antenna element is relatively long, the first antenna element may operate independently, and use performance of the foldable terminal device is not changed.

With reference to the first aspect, in some implementations of the first aspect, the operating frequency band of the first antenna element includes an operating frequency band of a near field communication NFC antenna.

Both a first part side and a second part side of the foldable terminal device may be used in an NFC application scenario, thereby improving use performance of the foldable terminal device.

Because two movable parts of the foldable terminal device may move relatively, an antenna position in the foldable terminal device may also move relatively. When the foldable terminal device is in an bar-type mode, a distance between antennas is relatively long, and impact between the antennas is relatively small. However, when the foldable terminal device is in a folded mode, the distance between the antennas is relatively close, and the impact between the antennas (for example, interference between the antennas and impact on antenna performance) cannot be ignored. Antennas with a same operating frequency band are disposed on the two movable parts of the foldable terminal device, and the antennas may be fed by a same feed source through a feeding line. This introduces a problem of complex arrangement of feeding lines. This application uses such impact in a way that the second antenna element disposed in the second part and the first antenna element disposed in the first part are coupled for feeding and operate in a same frequency band. In this way, signal interference caused by a distance change can be avoided, and use performance of antennas can be improved. Because the first antenna element and the second antenna element are not directly electrically connected by using a conducting wire, but are electrically connected in a coupling manner, existence of the second antenna element does not additionally introduce a problem of wiring difficulty.

DESCRIPTION OF EMBODIMENTS

The following describes technical solutions of this application with reference to the accompanying drawings.

Terms used in the following embodiments are merely intended to describe specific embodiments, but are not intended to limit this application. Terms "one", "a", "the", "the foregoing", "this", and "the one" of singular forms used in this specification and the appended claims of this application are also intended to include plural forms like "one or more", unless otherwise specified in the context clearly. It should be further understood that, in the embodiments of this application, "one or more" means one, two, or more. In addition, "and/or" describes an association relationship between associated objects, and indicates that three relationships may exist. For example. A and/or B may indicate the following cases: only A exists, both A and B exist, and only B exists, where A and B may be singular or plural. The character "/" generally indicates an "or" relationship between the associated objects.

Reference to "an embodiment", "some embodiments", or the like described in this specification indicates that one or more embodiments of this application include a specific feature, structure, or characteristic described with reference to the embodiments. Therefore, in this specification, statements, such as "in an embodiment", "in some embodiments", "in some other embodiments", and "in other embodiments", that appear at different places do not necessarily mean referring to a same embodiment, instead, the statements mean referring to "one or more but not all of the embodiments", unless otherwise specifically emphasized in other ways. Terms "include", "comprise", "have", and variants of the terms all mean "include but are not limited to", unless otherwise specifically emphasized in other ways.

The following describes specific implementations of the embodiments of this application in more detail with reference to specific examples. It should be noted that the examples below are merely intended to help a person skilled in the art understand the embodiments of this application, instead of limiting the embodiments of this application to a specific value or a specific scenario shown in the examples. It is clearly that a person skilled in the art can make various equivalent modifications or changes based on the following examples described above, and such modifications and changes also fall within the scope of the embodiments of this application.

The foldable terminal device provided in this embodiment of this application may be a further improvement on the basis of an existing foldable terminal device. Generally, one outer frame of the foldable terminal device may approach another outer frame of the foldable terminal device from a relatively far distance. The foldable terminal device usually includes a slide-type terminal device and a flip-type terminal device. A common foldable terminal device in daily life includes a foldable mobile phone.

Figure 1:
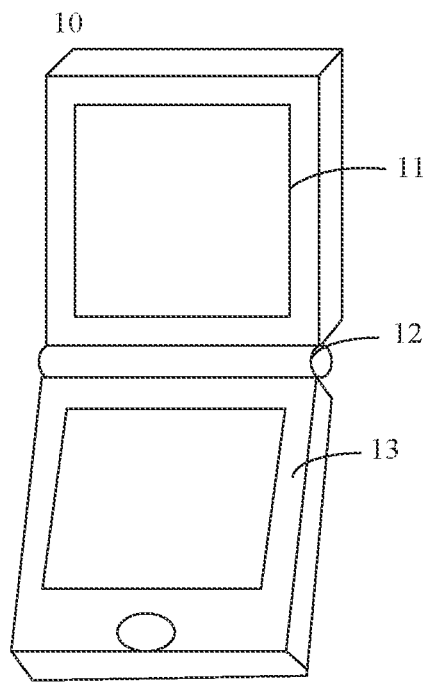
FIG. 1 is a schematic diagram of a foldable terminal device.

A flip-type mobile phone is used as an example. As shown in FIG. 1, the flip-type mobile phone 10 includes an outer housing 11, a rotating shaft 12, and an inner housing 13. An outer screen is mounted on the outer housing 11, and an inner screen is mounted on the inner housing 13.

It should be understood that the housing in this application includes a display surface and a reverse surface of the display surface. In other words, the housing has two surfaces. One surface may display a user interface, and the other surface may integrate circuits to connect to and communicate with another module of the mobile phone.

Optionally, when the outer housing 11 and the inner housing 13 are in a mode in which the flip-type mobile phone 10 is not flipped open (that is, the outer screen and the inner screen are folded to each other), the outer screen and the inner screen may be considered as two screens. When the flip-type mobile phone 10 is flipped open (that is, the outer screen and the inner screen are not folded to each other), the outer screen and the inner screen may form an entire screen, that is, the outer screen and the inner screen may actually be an entire flexible screen, but when folded, the outer screen and the inner screen are visually located on the two housings and form two screens.

Optionally, regardless of a mode of the flip-type mobile phone 10, the outer screen and the inner screen may be independent and are located on two housings connected by using the rotating shaft 12.

It should be understood that the foldable terminal device provided in this embodiment of this application is applicable to both a flexible screen and a non-flexible screen, and a screen material is not limited in this application.

It should be further understood that FIG. 1 is a schematic form, and the mobile phone further includes another part or module, but is not shown in FIG. 1. Because this application mainly relates to a locking apparatus for controlling opening and closing between the outer housing 11 and the inner housing 13 shown in FIG. 1, FIG. 1 shows only a part of the terminal device mainly involved in this application.

Figure 2:
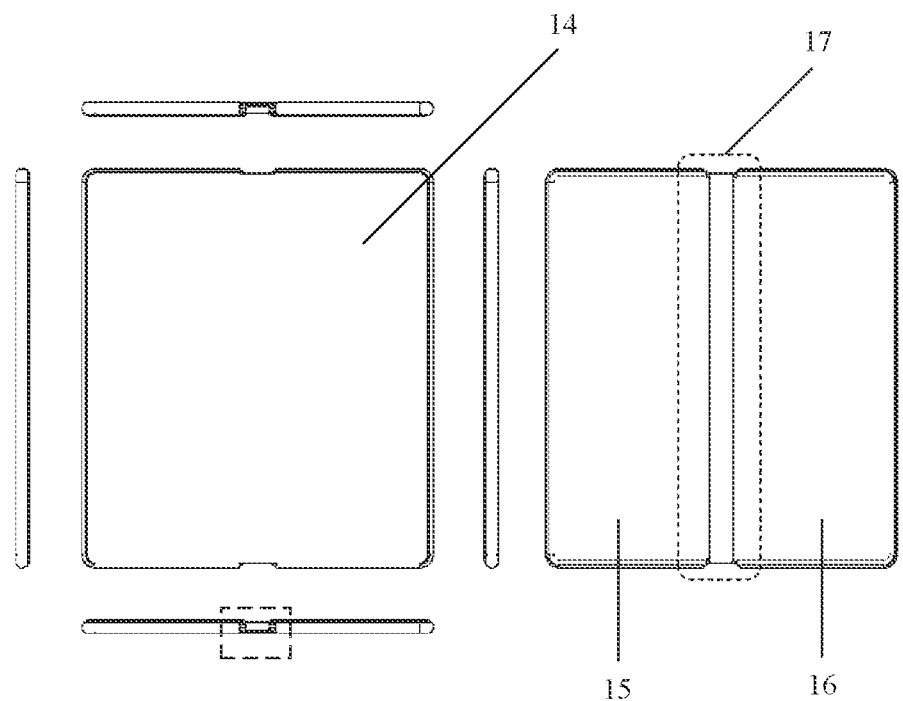
FIG. 2 is a schematic diagram of a foldable terminal device.

FIG. 2 is a schematic diagram of another foldable terminal device in an unfolded mode. FIG. 2 is a schematic diagram of appearance of the electronic device at six different angles: a front surface, a back surface, a bottom surface, a top surface, a left surface, and a right surface. 14 in the front view is a flexible screen component of the electronic device. 15 and 16 in the rear view are housings of the electronic device, for example, a first housing and a second housing. A dashed-line box shows a bending area 17 of the electronic device.

Figure 3:
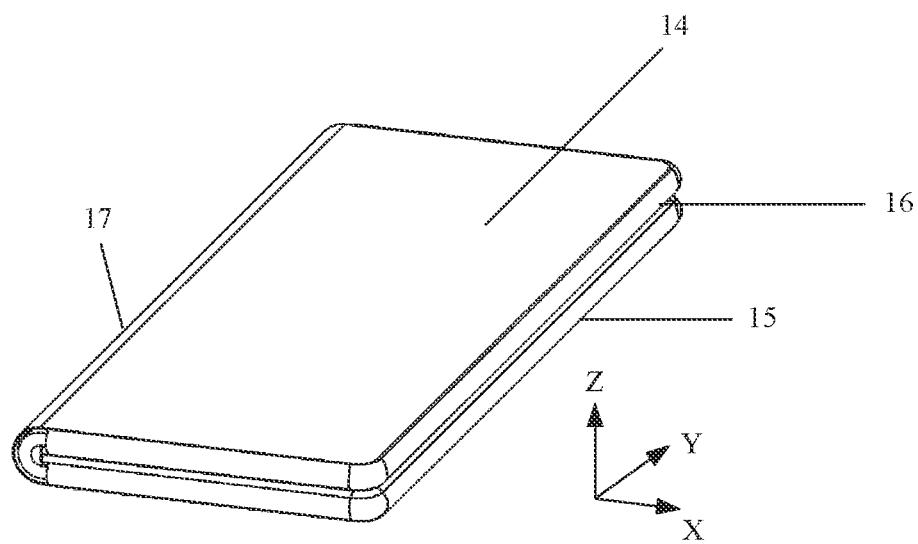
FIG. 3 is a schematic diagram of a foldable terminal device.

FIG. 3 is a schematic diagram of the foldable terminal device in a folded mode. As shown in FIG. 3, when the two housings rotate to be in the folded mode (an angle is 0 degrees), the bending structure 17 deforms, and the first housing 15 and the second housing 16 are stacked. The bending structure 17 may be a known bending structure used on a foldable terminal. Details are not described herein. In addition, when the first housing 15 is rotatably connected to the second housing 16, a component such as a common rotating shaft that can implement rotatable connection may also be used to perform the rotatable connection.

Figure 9:
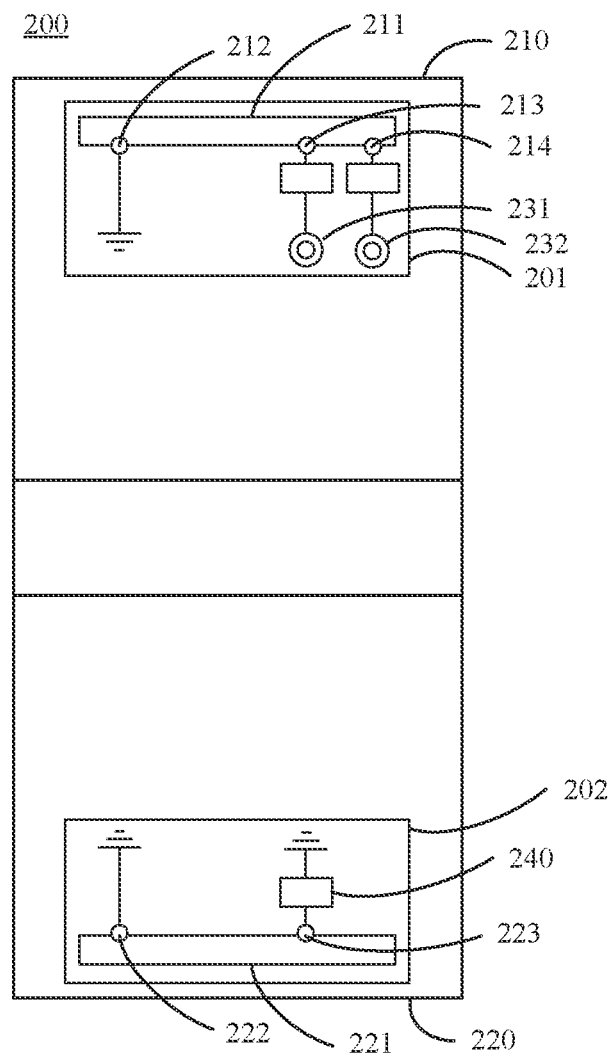
FIG. 9 is a schematic structural diagram of a foldable terminal device according to an embodiment of this application.

It should be understood that, for the foldable terminal device, the bending area 17 may be disposed longitudinally, and a flexible screen may be folded left and right along the longitudinally disposed bending area, as shown in FIG. 2. Alternatively, the bending area 17 may be disposed horizontally, and the flexible screen may be folded up and down along the horizontally disposed bending area, as shown in FIG. 9.

It should be further understood that, when the foldable terminal device is unfolded, a left screen may be folded in a direction facing a right screen, or may be folded in a direction opposite to the right screen. In the description of this embodiment of this application, an example in which the flexible screen component 14 shown in FIG. 3 is located on an outer surface of the foldable terminal device after folding is used for description. This is not limited in this application.

It should be further understood that FIG. 1 to FIG. 3 use an example in which the terminal device is a mobile phone. Actually, the terminal device in the technical solutions of the embodiments of this application may refer to user equipment, an access terminal, a user unit, a user station, a mobile station, a mobile console, a remote station, a remote terminal, a mobile device, a user terminal, a terminal, a wireless communications device, a user agent, or a user apparatus. The terminal device may alternatively be a cellular phone, a cordless phone, a session initiation protocol (session initiation protocol, SIP) phone, a wireless local loop (wireless local loop, WLL) station, a personal digital assistant (personal digital assistant, PDA), a handheld device having a wireless communication function, a computing device, another processing device connected to a wireless modem, a vehicle-mounted device, a wearable device, a terminal device in a future 5G network, or a terminal device in a future evolved public land mobile network (public land mobile network, PLMN). This is not limited in the embodiments of this application.

In the embodiments of this application, the terminal device includes a hardware layer, an operating system layer running above the hardware layer, and an application layer running above the operating system layer. The hardware layer includes hardware such as a central processing unit (central processing unit, CPU), a memory management unit (memory management unit, MMU), and a memory (which is also referred to as a main memory). The operating system may be any one or more computer operating systems that implement service processing by using a process (process), for example, a Linux operating system, a Unix operating system, an Android operating system, an iOS operating system, or a Windows operating system. The application layer includes applications such as a browser, an address book, word processing software, and instant messaging software.

In addition, aspects or features of this application may be implemented as a method, an apparatus or a product that uses standard programming and/or engineering technologies. The term "product" used in this application covers a computer program that can be accessed from any computer-readable component, carrier or medium. For example, the computer-readable medium may include but is not limited to: a magnetic storage component (for example, a hard disk, a floppy disk, or a magnetic tape), an optical disc (for example, a compact disc (compact disc, CD), and a digital versatile disc (digital versatile disc, DVD)), a smart card and a flash memory component (for example, erasable programmable read-only memory (erasable programmable read-only memory, EPROM), a card, a stick, or a key drive). In addition, various storage media described in this specification may indicate one or more devices and/or other machine-readable media that are configured to store information. The term "machine-readable media" may include but is not limited to a radio channel, and various other media that can store, contain, and/or carry instructions and/or data.

The foldable terminal device may have a folded mode and a bar-type mode. The folded mode may mean that one frame of the foldable terminal device approaches another frame of the foldable terminal device from a relatively far distance, and is sometimes referred to as a cover-closed mode. The bar-type mode may be, for example, an initial mode before the occurrence of the above-described "approaching" process, and may sometimes be referred to as a cover-opened mode.

In the two different modes, relative positions of electronic elements in the foldable terminal device are different. In the folded mode and in the bar-type mode, the foldable terminal device sometimes has different use performance. Changing relative positions of antennas in the foldable terminal device usually causes a change in use performance of the antennas. This affects user experience.

To resolve the foregoing disadvantage, this application provides a foldable terminal device, to unify use performance of the foldable terminal device and improve user experience.

Figure 4:
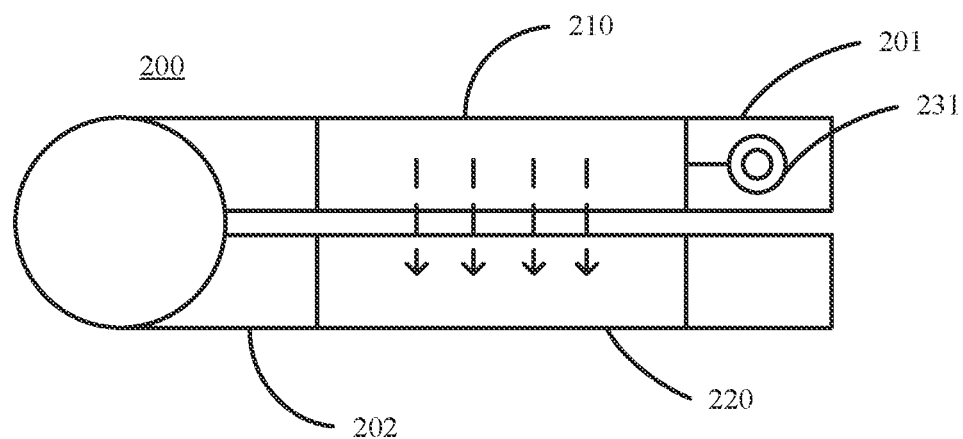
FIG. 4 is a schematic structural diagram of a foldable terminal device according to an embodiment of this application.

FIG. 4 is a schematic structural diagram of a foldable terminal device 200 according to an embodiment of this application. The foldable terminal device 200 includes a first part 201 and a second part 202 that are foldable. It should be understood that, when the foldable terminal device 200 is in a folded mode, a frame of the first part 201 may be close to a frame of the second part 202, and the first part 201 and the second part 202 are configured to be folded.

The first part 201 is configured with a first antenna element 210, and the second part 202 is configured with a second antenna element 220. The terminal device 200 further includes a first feed source 231 that feeds the first antenna element 210, so that the first antenna element 210 can operate in an operating frequency band.

When the foldable terminal device 200 is folded, the second antenna element 220 is coupled to the first antenna element 210 for coupled feeding, so that the second antenna element 220 can operate in the operating frequency band of the first antenna element 210.

It should be understood that the "first part 201" and the "second part 202" may be two components on the foldable terminal device 200, for example, may be a display 1 and a display 2, or may be a frame 1 and a frame 2. The "first part 201" and the "second part 202" may alternatively be two areas of the foldable terminal device 200, for example, may be a top area and a bottom area of the foldable terminal device 200, or for another example, may be an exposed area and an included area of the foldable terminal device 200.

In this embodiment of this application, an "antenna element" is an entity module that has a function of receiving a signal or sending a signal. One antenna element may operate in one or more frequency bands.

In this embodiment of this application, specific positions of the first antenna element 210 and the second antenna element 220 in the foldable terminal device 200 are not limited. For example, the first antenna element 210 may be located at an earpiece end of the foldable terminal device 200, and the second antenna element 220 may be located at a microphone end of the foldable terminal device 200. Alternatively, the first antenna element 210 may be located at the microphone end of the foldable terminal device 200, and the second antenna element 220 may be located at the earpiece end of the foldable terminal device 200. It should be understood that, in this embodiment of this application, a position of the first antenna element 210 and a position of the second antenna element 220 may be exchanged.

Optionally, the first part 201 includes a first frame, and the second part 202 includes a second frame; and the first antenna element 210 is disposed around the first frame, the second antenna element 220 is disposed around the second frame, and when the foldable terminal device 200 is folded, the first frame and the second frame are located on a same side of the foldable terminal device 200.

Figure 5:
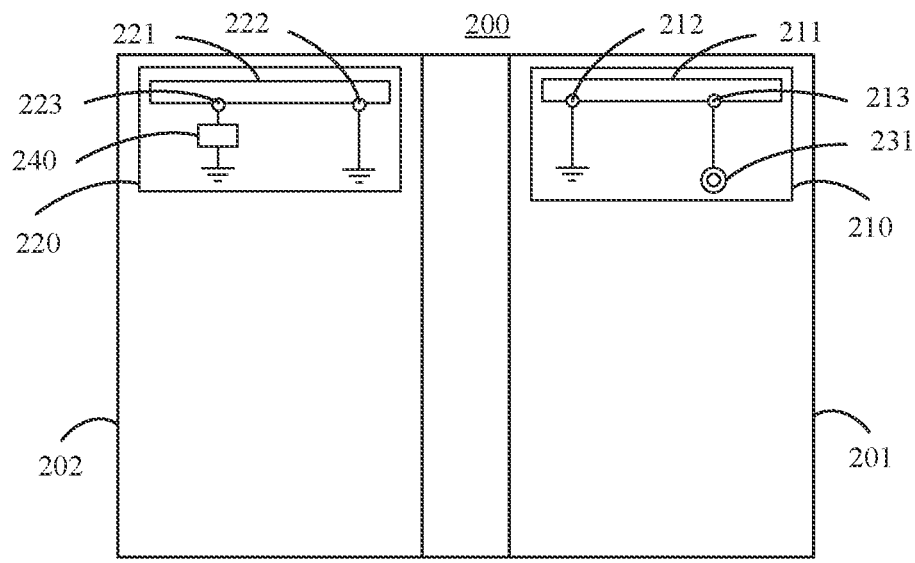
FIG. 5 is a schematic structural diagram of a foldable terminal device according to an embodiment of this application.

FIG. 5 is a schematic diagram of the foldable terminal device 200 in a bar-type mode. The first antenna element 210 is disposed near the first frame on the left of the top of the foldable terminal device 200, and the second antenna element 220 is disposed near the second frame on the right of the top of the foldable terminal device 200. When the foldable terminal device 200 is folded along a bendable middle area, both the first frame and the second frame are located on the top of the foldable terminal device 200, that is, located on the same side of the foldable terminal device 200.

Figure 6:
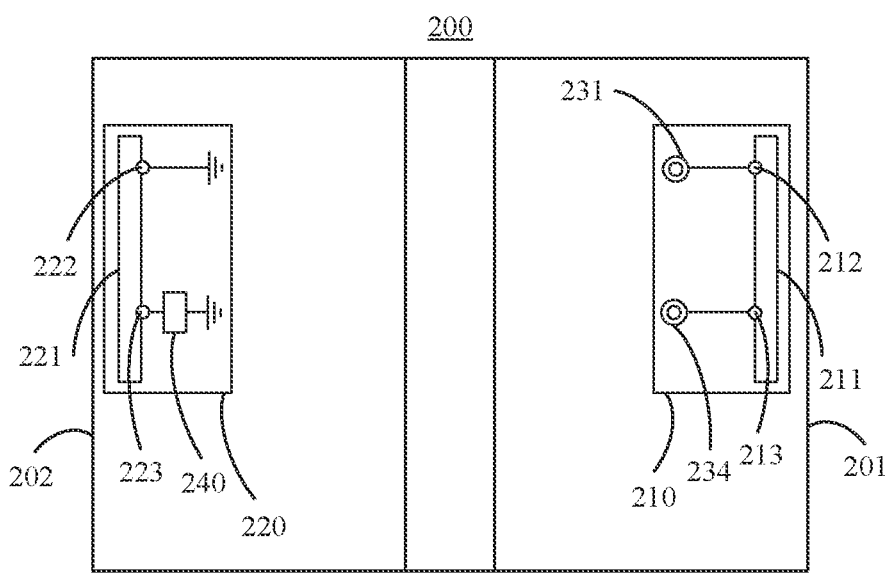
FIG. 6 is a schematic structural diagram of a foldable terminal device according to an embodiment of this application.

FIG. 6 is a schematic diagram of the foldable terminal device 200 in a bar-type mode. The first antenna element 210 is disposed near the first frame on the left of the center of the foldable terminal device 200, and the second antenna element 220 is disposed near the second frame on the right of the center of the foldable terminal device 200. When the foldable terminal device 200 is folded along the bendable middle area, both the first frame and the second frame are located on the same side of the foldable terminal device 200.

FIG. 9 is a schematic diagram of the foldable terminal device 200 in a bar-type mode. The first antenna element 210 is disposed near the first frame on the top of the foldable terminal device 200, and the second antenna element 220 is disposed near the second frame on the bottom of the foldable terminal device 200. When the foldable terminal device 200 is folded along the bendable middle area, both the first frame and the second frame are located on the top of the foldable terminal device 200, that is, located on the same side of the foldable terminal device 200.

Figure 10:
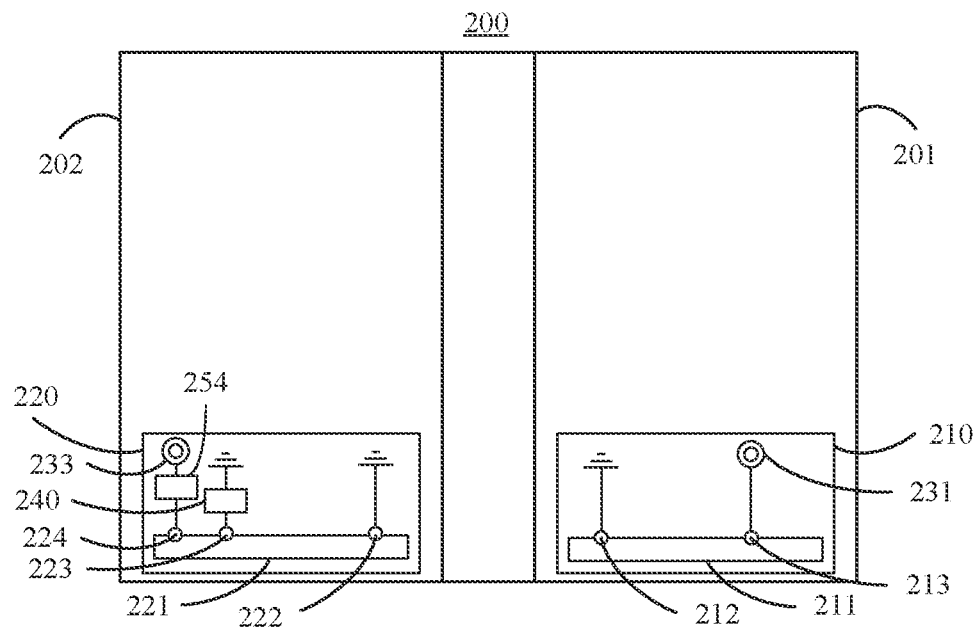
FIG. 10 is a schematic structural diagram of a foldable terminal device according to an embodiment of this application.

FIG. 10 is a schematic diagram of the foldable terminal device 200 in a bar-type mode. The first antenna element 210 is disposed near the first frame on the left of the bottom of the foldable terminal device 200, and the second antenna element 220 is disposed near the second frame on the right of the bottom of the foldable terminal device 200. When the foldable terminal device 200 is folded along the bendable middle area, both the first frame and the second frame are located on the bottom of the foldable terminal device 200, that is, located on the same side of the foldable terminal device 200.

When the foldable terminal device 200 is folded, the first frame and the second frame are located on the same side of the foldable terminal device 200. In this case, the first antenna element 210 is relatively close to the second antenna element 220, so that a coupling feeding effect is better. In addition, the first antenna element 210 and the second antenna element 220 are relatively close to the frames of the foldable terminal device 200, so that signals can be easily radiated.

In this embodiment of this application, the first antenna element 210 and the second antenna element 220 may not be disposed at positions on the foldable terminal device 200 that are near the frames.

Coupling feeding generally means that two circuit elements conduct electrical energy in a coupling manner. The dashed line in FIG. 4 shows that the first antenna element 210 is coupled to the second antenna element 220 for coupled feeding, that is, the first antenna element 210 conducts electrical energy to the second antenna element 220 in a coupling manner. To meet use performance of the antenna, in this embodiment of this application, "coupling feeding" may refer to implementing, in a coupling manner, feeding that meets a preset condition. For example, when the antenna is normally used, parameters such as coupling feeding efficiency and coupling feeding strength meet preset conditions.

It should be understood that, that the second antenna element 220 operates on the operating frequency band of the first antenna element 210 may mean that the second antenna element 220 operates on a part or all of the operating frequency band of the first antenna element 210. For example, when the foldable terminal device 200 is folded, the first antenna element 210 is fed by the first feed source 231, so that the first antenna element 210 can operate in a frequency band 1. The second antenna element 220 is coupled to and fed by the first antenna element 210, so that the second antenna element 220 can operate in the frequency band 1. For another example, the first antenna element 210 is fed by the first feed source 231, so that the first antenna element 210 can operate in the frequency band 1, and the first antenna element 210 is further fed by another feed source, so that the first antenna element 210 can operate in a frequency band 2. When the foldable terminal device 200 is folded, the second antenna element 220 is coupled to and fed by the first antenna element 210, so that the second antenna element 220 can operate in the frequency band 1 or operate in the frequency band 2.

It should be understood that, in addition to operating on the operating frequency band of the first antenna element 210, the second antenna element 220 can also operate in another frequency band. For example, the foldable terminal device 200 includes a feed source 1 that feeds the second antenna element 220, so that the second antenna element 220 can operate in a frequency band 3. In addition, when the foldable terminal device 200 is folded, the second antenna element 220 is coupled to and fed by the first antenna element 210, so that the second antenna element 220 can operate in the operating frequency band of the first antenna element 210.

There are a plurality of manners of implementing an operating frequency band of the second antenna element 220 to be the same as that of the first antenna element 210. For example, an electronic element that can play a tuning function such as an inductor or a capacitor may be used to adjust the operating frequency band of the second antenna element 220 to be the same as that of the first antenna element 210. The manner of implementing the operating frequency band of the second antenna element 220 to be the same as that of the first antenna element 210 may be similar to that in the current technology. To avoid repetition, description is omitted herein.

It should be understood that the operating frequency band of the first antenna element 210 may include, for example, a frequency band of 2.4 GHz to 2.5 GHz that is used for communication of wireless fidelity (wireless fidelity, WiFi), Bluetooth (Bluetooth®), and the like. The operating frequency band of the first antenna element 210 may further include, for example, a near field communication (near field communication, NFC) frequency band of 13.56 MHz. The operating frequency band of the first antenna element 210 may further include, for example, frequency bands of 600 MHz to 960 MHz and 1700 MHz to 3500 MHz that are used for a high-speed data network (cellular) 2G, a high-speed data network 3G, and a high-speed data network 4G. The operating frequency band of the first antenna element 210 may further include an operating frequency band used for a future 5G network.

When the foldable terminal device 200 is in a bar-type mode, because the second part 202 is relatively far away from the first part 201, the first antenna element 210 configured in the first part 201 may normally operate in a specific frequency band. However, when the foldable terminal device 200 is in a folded mode, the second part 202 is relatively close to the first part 201, and an electronic element disposed in the second part 202 affects an electronic element disposed in the first part 201. This application uses such impact in a way that the second antenna element 220 disposed in the second part 202 and the first antenna element 210 disposed in the first part 201 are coupled for feeding and operate in a same frequency band. In this way, signal interference caused by a distance change can be avoided, and use performance of antennas can be improved. For example, if both the first antenna element 210 and the second antenna element 220 operate in the NFC frequency band, a near field communication read-write (read-write) capability and a card emulation (card emulation) capability of the foldable terminal device 200 can be improved. Because the first antenna element 210 and the second antenna element 220 are not directly electrically connected by using a conducting wire, but are electrically connected in a coupling manner, existence of the second antenna element 220 does not additionally introduce a problem of wiring difficulty.

Optionally, the first antenna element 210 includes a first antenna radiator 211. The first antenna radiator 211 includes a first connection point 212 and a second connection point 213. The first connection point 212 of the first antenna radiator 211 is grounded, and the second connection point 213 of the second antenna radiator 221 is electrically connected to the first feed source 231. The second antenna element 220 includes a second antenna radiator 221 and a first tuning element, and the second antenna radiator 221 is configured to couple to the first antenna radiator 211 for coupled feeding when the foldable terminal device 200 is folded. The second antenna radiator 221 includes a third connection point 222 and a fourth connection point 223. Both the third connection point 222 of the second antenna radiator 221 and the fourth connection point 223 of the second antenna radiator 221 are grounded. The first tuning element is electrically connected between a ground and the third connection point 222 of the second antenna radiator 221, and is configured to adjust the operating frequency band of the second antenna element 220 to include the operating frequency band of the first antenna element 210.

As shown in FIG. 5, the first antenna element 210 of the foldable terminal device 200 includes the first antenna radiator 211 configured to receive or send a signal. The first antenna radiator 211 includes one or more connection points. The first connection point 212 of the first antenna radiator 211 is grounded, and the second connection point 213 of the first antenna radiator 211 is electrically connected to the first feed source 231, so that the first feed source 231 feeds the first antenna element 210. Therefore, an area of the first antenna radiator 211 from the first connection point 212 to the second connection point 213 can operate in an operating frequency band. The second antenna element 220 of the foldable terminal device 200 includes the second antenna radiator 221 configured to receive or send a signal. The second antenna radiator 221 includes one or more connection points. The third connection point 222 of the second antenna radiator 221 is grounded, the fourth connection point 223 of the second antenna radiator 221 is electrically connected to one end of a tuning element, and the other end of the tuning element is grounded. When the foldable terminal device 200 is folded, the second antenna radiator 221 is coupled to the first antenna radiator 211 for coupled feeding. Therefore, an area of the second antenna radiator 221 from the third connection point 222 to the fourth connection point 223 can operate in the operating frequency band of the first antenna radiator 211, so that the second antenna element 220 operates on the operating frequency band of the first antenna element 210.

It should be understood that the one or more connection points of the first antenna radiator 211 may be used to indicate a connection position at which the first antenna radiator 211 is electrically connected to another element. Similarly, the one or more connection points of the second antenna radiator 221 may be used to indicate a connection position at which the second antenna radiator 221 is electrically connected to another element.

In addition to the case shown in FIG. 5, for an element layout, a circuit connection manner, and the like of the foldable terminal device 200, the foldable terminal device 200 provided in this application may have another possible implementation.

Optionally, the foldable terminal device 200 further includes a second feed source 234. The first antenna element 210 is fed by the first feed source 231 and the second feed source 234. The first antenna element 210 includes the first antenna radiator 211. The first antenna radiator 211 includes the first connection point 212 and the second connection point 213. The first connection point 212 of the first antenna radiator 211 is electrically connected to the second feed source 234, and the second connection point 213 of the second antenna radiator 221 is electrically connected to the first feed source 231. The second antenna element 220 includes the second antenna radiator 221 and a first tuning element, and the second antenna radiator 221 is configured to couple to the first antenna radiator 211 for coupled feeding. The second antenna radiator 221 includes the third connection point 222 and the fourth connection point 223. Both the third connection point 222 of the second antenna radiator 221 and the fourth connection point 223 of the second antenna radiator 221 are grounded. The first tuning element is electrically connected between a ground and the third connection point 222 of the second antenna radiator 221, and is configured to adjust the operating frequency band of the second antenna element 220 to include the operating frequency band of the first antenna element 210.

As shown in FIG. 6, the foldable terminal device 200 further includes the second feed source 234. The first antenna element 210 is fed by the first feed source 231 and the second feed source 234. The first antenna element 210 includes the first antenna radiator 211 configured to receive or send a signal. The first antenna radiator 211 includes one or more connection points. The first connection point 212 of the first antenna radiator 211 is electrically connected to the second feed source 234, and the second connection point 213 of the first antenna radiator 211 is electrically connected to the first feed source 231, where the first feed source 231 and the second feed source 234 are two feed sources providing differential signals for the first antenna radiator together, so that the first feed source 231 and the second feed source 234 feed the first antenna element 210. Therefore, an area of the first antenna radiator 211 from the first connection point 212 to the second connection point 213 can operate in an operating frequency band. The second antenna element 220 of the foldable terminal device 200 includes the second antenna radiator 221 configured to receive or send a signal. The second antenna radiator 221 includes one or more connection points. The third connection point 222 of the second antenna radiator 221 is grounded, the fourth connection point 223 of the second antenna radiator 221 is electrically connected to one end of a tuning element, and the other end of the tuning element is grounded. When the foldable terminal device 200 is folded, the second antenna radiator 221 is coupled to the first antenna radiator 211 for coupled feeding. Therefore, an area of the second antenna radiator 221 from the third connection point 222 to the fourth connection point 223 can operate in the operating frequency band of the first antenna radiator 211, so that the second antenna element 220 operates on the operating frequency band of the first antenna element 210.

It should be understood that, to improve coupling feeding efficiency between the first antenna radiator 211 and the second antenna radiator 221, when the foldable terminal device 200 is folded, distances from most point positions of the area of the first antenna radiator 211 from the first connection point 212 to the second connection point 213 to the area of the second antenna radiator 221 from the third connection point 222 to the fourth connection point 223 should be as close as possible. Correspondingly, distances from most point positions of the area of the second antenna radiator 221 from the third connection point 222 to the fourth connection point 223 to the area of the first antenna radiator 211 from the first connection point 212 to the second connection point 213 should be as close as possible.

Optionally, when the foldable terminal device 200 is folded, a distance between the first connection point 212 of the first antenna radiator 211 and the third connection point 222 of the second antenna radiator 221 is less than a first preset threshold, and a distance between the second connection point 213 of the first antenna radiator 211 and the fourth connection point 223 of the second antenna radiator 221 is less than a second preset threshold; or a distance between the first connection point 212 of the first antenna radiator 211 and the fourth connection point 223 of the second antenna radiator 221 is less than the first preset threshold, and a distance between the second connection point 213 of the first antenna radiator 211 and the third connection point 222 of the second antenna radiator 221 is less than the second preset threshold.

It should be understood that both the first preset threshold and the second preset threshold may be preset based on a specific situation. This is not limited in this embodiment of this application.

Figure 7:
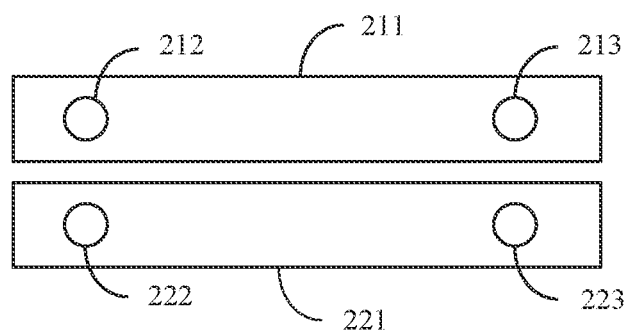
FIG. 7 is a schematic view diagram of a foldable terminal device according to an embodiment of this application.
Figure 8:
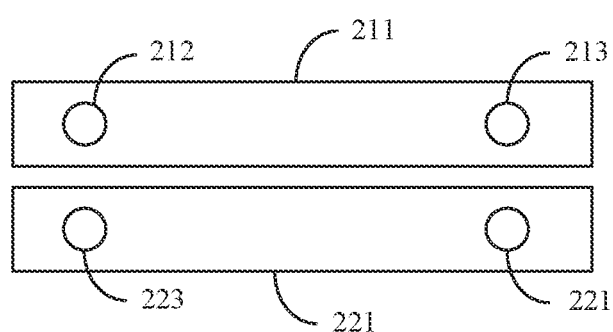
FIG. 8 is a schematic view diagram of a foldable terminal device according to an embodiment of this application.

The first antenna radiator 211 and the second antenna radiator 221 are disposed in parallel or approximately parallel on the foldable terminal device 200. The foldable terminal device 200 is viewed from a side surface of the foldable terminal device 200 and from an angle at which a longest side of the first antenna radiator 211 or the second antenna radiator 221 can be observed, as shown in FIG. 7 and FIG. 8. FIG. 7 shows a case in which a distance between the first connection point 212 of the first antenna radiator 211 and the third connection point 222 of the second antenna radiator 221 is less than a first preset threshold, and a distance between the second connection point 213 of the first antenna radiator 211 and the fourth connection point 223 of the second antenna radiator 221 is less than a second preset threshold. The first connection point 212 of the first antenna radiator 211 is correspondingly disposed right above the third connection point 222 of the second antenna radiator 221, and the second connection point 213 of the first antenna radiator 211 is correspondingly disposed right above the fourth connection point 223 of the second antenna radiator 221. In this case, a projection area of the area of the first antenna radiator 211 from the first connection point 212 to the second connection point 213 on the second antenna radiator 221 coincides with the area of the second antenna radiator 221 from the third connection point 222 to the fourth connection point 223. In other words, the first connection point 212 of the first antenna radiator 211 is aligned with the third connection point 222 of the second antenna radiator 221, and the second connection point 213 of the first antenna radiator 211 is aligned with the fourth connection point 223 of the second antenna radiator 221.

FIG. 8 shows a case in which a distance between the first connection point 212 of the first antenna radiator 211 and the fourth connection point 223 of the second antenna radiator 221 is less than a first preset threshold, and a distance between the second connection point 213 of the first antenna radiator 211 and the third connection point 222 of the second antenna radiator 221 is less than a second preset threshold. The first connection point 212 of the first antenna radiator 211 is correspondingly disposed right above the fourth connection point 223 of the second antenna radiator 221, and the second connection point 213 of the first antenna radiator 211 is correspondingly disposed right above the third connection point 222 of the second antenna radiator 221. In this case, a projection area of the area of the first antenna radiator 211 from the first connection point 212 to the second connection point 213 on the second antenna radiator 221 coincides with an area of the second antenna radiator 221 from the fourth connection point 223 to the third connection point 222. In other words, the first connection point 212 of the first antenna radiator 211 is aligned with the fourth connection point 223 of the second antenna radiator 221, and the second connection point 213 of the first antenna radiator 211 is aligned with the third connection point 222 of the second antenna radiator 221.

Optionally, the first antenna element 210 is fed by the first feed source 231 and operates on a first frequency band. The foldable terminal device 200 further includes: a third feed source 232, where the first antenna element 210 is fed by the third feed source 232 and operates on a second frequency band; a first filtering element, electrically connected between the first feed source 231 and the first antenna element 210, and configured to filter a signal of the second frequency band; and a second filtering element, electrically connected between the third feed source 232 and the first antenna element 210, and configured to filter a signal of the first frequency band.

The first antenna element 210 can multiplex a plurality of antennas, so as to operate in a plurality of frequency bands.

As shown in FIG. 9, the first feed source 231 provides a feed for the first antenna element 210, so that the first antenna element 210 can operate in the first frequency band. The first antenna element 210 further includes a fifth connection point 214, and the foldable terminal device 200 further includes the third feed source 232 electrically connected to the fifth connection point 214 of the first antenna element 210. The third feed source 232 provides a feed for the first antenna element 210, so that the first antenna element 210 can operate in the second frequency band. An area of the first antenna element 210 from the first connection point 212 to the second connection point 213 may be configured to radiate a signal of the first frequency band, and an area of the first antenna element 210 from the first connection point 212 to the fifth connection point 214 may be configured to radiate a signal of the second frequency band. To avoid interference generated between different frequency bands, the first filtering element is connected in series on a connection path on which the second connection point 213 of the first antenna element 210 is electrically connected to the first feed source 231, and the first filtering element is configured to filter the signal of the second frequency band; and the second filtering element is connected in series on a connection path on which the fifth connection point 214 of the first antenna element 210 is electrically connected to the third feed source 232, and the second filtering element is configured to filter the signal of the first frequency band.

It should be understood that the filtering element in this application may be an element such as a capacitor or an inductor, or may be a filtering apparatus configured with a plurality of elements.

Still using FIG. 9 as an example, if the first frequency band is a low frequency band, for example, may be 10 MHz to 50 MHz, and the second frequency band is a high frequency band, for example, may be more than 600 MHz, the first filtering element may be an inductor, and the second filtering element may be a capacitor.

When the foldable terminal device 200 is folded, the second antenna element 220 may be coupled to the first antenna element 210 for coupled feeding, and operates on the first frequency band or the second frequency band.

Optionally, the foldable terminal device 200 further includes: a second tuning element 241, electrically connected to the first antenna element 210, and configured to adjust the second frequency band.

Figure 11:
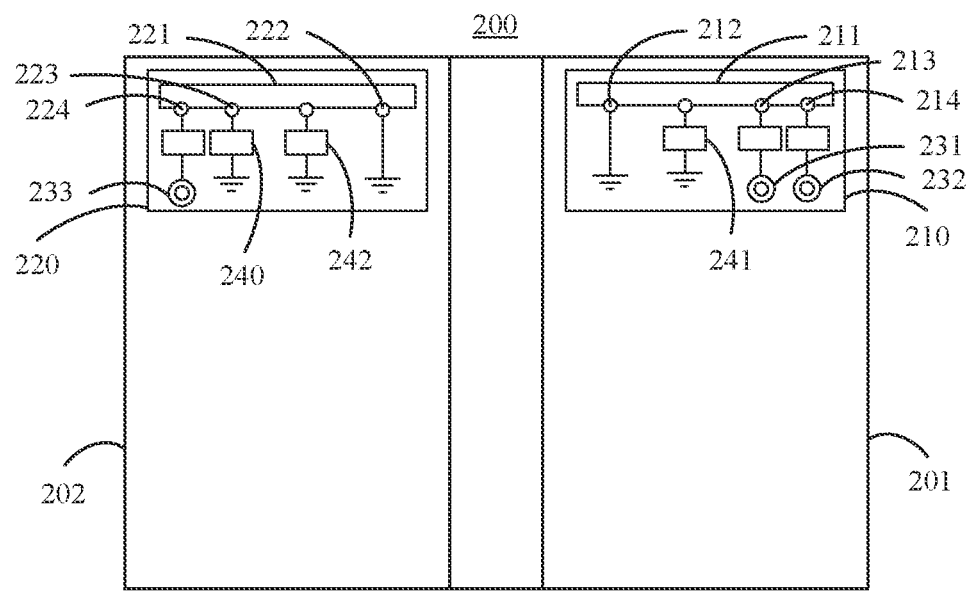
FIG. 11 is a schematic structural diagram of a foldable terminal device according to an embodiment of this application.

As shown in FIG. 11, the second tuning element 241 is electrically connected to the first antenna element 210, and is configured to adjust the second frequency band. For example, the second frequency band may be adjusted from the high frequency band to a medium-high frequency band.

Optionally, the second antenna element 220 is coupled to and fed by the first antenna element 210 and operates on a third frequency band. The foldable terminal device 200 further includes: a fourth feed source 233, a third filtering element, and a fourth filtering element. The second antenna element 220 is fed by the fourth feed source 233 and operates on a fourth frequency band. The third filtering element is electrically connected between a ground and the second antenna element 220, and is configured to filter a signal of the fourth frequency band. The fourth filtering element is electrically connected between the fourth feed source 233 and the second antenna element 220, and is configured to filter a signal of the third frequency band.

The first antenna element 210 can multiplex a plurality of antennas, so as to operate in a plurality of frequency bands.

As shown in FIG. 10, the first antenna element 210 provides a feed for the second antenna element 220, so that the second antenna element 220 can operate in the third frequency band. The second antenna element 220 further includes a sixth connection point 224, and the foldable connection device further includes the fourth feed source 233 electrically connected to the sixth connection point 224 of the second antenna element 220. The fourth feed source 233 provides a feed for the second antenna element 220, so that the second antenna element 220 can operate in the fourth frequency band. An area of the second antenna element 220 from the third connection point 222 to the fourth connection point 223 may be configured to radiate a signal of the third frequency band, and an area of the second antenna element 220 from the third connection point 222 to the sixth connection point 224 may be configured to radiate a signal of the fourth frequency band. To avoid interference generated between different frequency bands, the third filtering element is connected in series on a connection path on which the fourth connection point 223 of the second antenna element 220 is electrically connected to a ground, and the third filtering element is configured to filter the signal of the fourth frequency band; and the fourth filtering element is connected in series on a connection path on which the sixth connection point 224 of the second antenna element 220 is electrically connected to the third feed source 232, and the fourth filtering element is configured to filter the signal of the third frequency band.

FIG. 10 is used as an example, if the third frequency band is a low frequency band, for example, may be 10 MHz to 50 MHz, and the fourth frequency band is a high frequency band, for example, may be more than 600 MHz, the third filtering element may be an inductor, and the fourth filtering element may be a capacitor.

Because a first tuning element 240 is connected in series between the fourth connection point 223 of the second antenna element 220 and the ground, in some cases, the first tuning element may be configured to not only tune an operating frequency band of the second antenna element to include an operating frequency band of the first antenna element, but also filter the fourth frequency band. The first tuning element 240 shown in FIG. 10 may be the third filtering element.

When the foldable terminal device 200 is folded, the second antenna element 220 can operate in the operating frequency band of the first antenna element 210 and the fourth frequency band.

Optionally, the foldable terminal device 200 further includes: a third tuning element 242, electrically connected to the second antenna element 220, and configured to adjust the fourth frequency band.

As shown in FIG. 11, the third tuning element 242 is electrically connected to the second antenna element 220, and is configured to adjust the fourth frequency band. For example, the fourth frequency band may be adjusted from the high frequency band to a medium-high frequency band.

FIG. 11 is a foldable terminal device 200 according to this application. The first feed source 231 provides a feed for the first antenna element 210, so that the first antenna element 210 can operate in the first frequency band. The first antenna element 210 further includes a fifth connection point 214, and the foldable terminal device 200 further includes the third feed source 232 electrically connected to the fifth connection point 214 of the first antenna element 210. The third feed source 232 provides a feed for the first antenna element 210, so that the first antenna element 210 can operate in the second frequency band. An area of the first antenna element 210 from the first connection point 212 to the second connection point 213 may be configured to radiate a signal of the first frequency band, and an area of the first antenna element 210 from the first connection point 212 to the fifth connection point 214 may be configured to radiate a signal of the second frequency band. To avoid interference generated between different frequency bands, the first filtering element is connected in series on a connection path on which the second connection point 213 of the first antenna element 210 is electrically connected to the first feed source 231, and the first filtering element is configured to filter the signal of the second frequency band; and the second filtering element is connected in series on a connection path on which the fifth connection point 214 of the first antenna element 210 is electrically connected to the third feed source 232, and the second filtering element is configured to filter the signal of the first frequency band. The first antenna element 210 provides a feed for the second antenna element 220, so that the second antenna element 220 can operate in the third frequency band. The second antenna element 220 further includes a sixth connection point 224, and the foldable terminal device further includes the fourth feed source 233 electrically connected to the sixth connection point 224 of the second antenna element 220. The fourth feed source 233 provides a feed for the second antenna element 220, so that the second antenna element 220 can operate in the fourth frequency band. An area of the second antenna element 220 from the third connection point 222 to the fourth connection point 223 may be configured to radiate a signal of the third frequency band, and an area of the second antenna element 220 from the third connection point 222 to the sixth connection point 224 may be configured to radiate a signal of the fourth frequency band. To avoid interference generated between different frequency bands, the third filtering element is connected in series on a connection path on which the fourth connection point 223 of the second antenna element 220 is electrically connected to a ground, and the third filtering element is configured to filter the signal of the fourth frequency band; and the fourth filtering element is connected m series on a connection path on which the sixth connection point 224 of the second antenna element 220 is electrically connected to the third feed source 232, and the fourth filtering element is configured to filter the signal of the third frequency band.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, function units in the embodiments of this application may be integrated into one processing unit, or each of the units may exist alone physically, or two or more units are integrated into one unit.

When the functions are implemented in the form of a software function unit and sold or used as an independent product, the functions may be stored in a computer-readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of this application. The foregoing storage medium includes: any medium that can store program code, such as a USB flash drive, a removable hard disk, a read-only memory (read-only memory, ROM), a random access memory (random access memory. RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

The invention claimed is:

1. A foldable terminal device, comprising:
a first feed source;
a first part configured with a first antenna element, wherein the first antenna element is configured to be fed by the first feed source; and
a second part configured with a second antenna element, wherein the second part is configured to couple to the first antenna element for coupled feeding when the foldable terminal device is folded, and
wherein the first antenna element and the second antenna element are configured to operate in a first frequency band when the foldable terminal device is folded.

2. The foldable terminal device of claim 1, wherein the first antenna element comprises a first antenna radiator, wherein the first antenna radiator comprises a first connection point and a second connection point, wherein the first connection point is grounded, wherein the second connection point is electrically connected to the first feed source, wherein the second antenna element comprises a second antenna radiator, a third connection point, a fourth connection point, and a first tuning element, wherein the second antenna radiator is configured to couple to the first antenna radiator for coupled feeding when the foldable terminal device is folded, wherein both the third connection point and the fourth connection point are grounded, and wherein the first tuning element is electrically connected between a ground and the third connection point and is configured to adjust an operating frequency band of the second antenna element.

3. The foldable terminal device of claim 2, wherein when the foldable terminal device is folded, a first distance between the first connection point and the third connection point is less than a first preset threshold, and a second distance between the second connection point and the fourth connection point is less than a second preset threshold.

4. The foldable terminal device of claim 2, wherein when the foldable terminal device is folded, a first distance between the first connection point and the fourth connection point is less than a first preset threshold, and a second distance between the second connection point and the third connection point is less than a second preset threshold.

5. The foldable terminal device of claim 2, wherein the first part comprises a first frame, wherein the second part comprises a second frame, wherein the first antenna element is disposed around the first frame, wherein the second antenna element is disposed around the second frame, and wherein when the foldable terminal device is folded, the first frame and the second frame are configured to be located on a same side of the foldable terminal device.

6. The foldable terminal device of claim 2, wherein the first part comprises a first frame, wherein the second part comprises a second frame, wherein when the foldable terminal device is folded, the first frame and the second frame are configured to be located on a same side of the foldable terminal device, wherein the first antenna radiator is the first frame, and wherein the second antenna radiator is the second frame.

7. The foldable terminal device of claim 1, wherein the foldable terminal device further comprises a second feed source, wherein the first antenna element is configured to be fed by the first feed source and the second feed source, wherein the first antenna element comprises a first antenna radiator, wherein the first antenna radiator comprises a first connection point and a second connection point, wherein the first connection point is electrically connected to the second feed source, wherein the second connection point is electrically connected to the first feed source, wherein the second antenna element comprises a second antenna radiator, a third connection point, a fourth connection point, and a first tuning element, wherein the second antenna radiator is configured to couple to the first antenna radiator for coupled feeding when the foldable terminal device is folded, wherein both the third connection point and the fourth connection point are grounded, and wherein the first tuning element is electrically connected between a ground and the third connection point and is configured to adjust an operating frequency band of the second antenna element.

8. The foldable terminal device of claim 7, wherein when the foldable terminal device is folded, a first distance between the first connection point and the third connection point is less than a first preset threshold, and wherein a second distance between the second connection point and the fourth connection point is less than a second preset threshold.

9. The foldable terminal device of claim 7, wherein when the foldable terminal device is folded, a first distance between the first connection point and the fourth connection point is less than a first preset threshold, and a second distance between the second connection point and the third connection point is less than a second preset threshold.

10. The foldable terminal device of claim 7, wherein the first part comprises a first frame, wherein the second part comprises a second frame, wherein the first antenna element is disposed around the first frame, wherein the second antenna element is disposed around the second frame, and wherein when the foldable terminal device is folded, the first frame and the second frame are configured to be located on a same side of the foldable terminal device.

11. The foldable terminal device of claim 7, wherein the first part comprises a first frame, wherein the second part comprises a second frame, wherein when the foldable terminal device is folded, the first frame and the second frame are configured to be located on a same side of the foldable terminal device, wherein the first antenna radiator is the first frame, and wherein the second antenna radiator is the second frame.

12. The foldable terminal device of claim 1, wherein the first antenna element is configured to be fed by the first feed source and operate in the first frequency band, wherein the foldable terminal device further comprises a third feed source, a first filtering element, and a second filtering element, wherein the first antenna element is configured to be fed by the third feed source and operate on a second frequency band, wherein the first filtering element is electrically connected between the first feed source and the first antenna element, wherein the first filtering element is configured to filter a first signal of the second frequency band, wherein the second filtering element is electrically connected between the third feed source and the first antenna element, and wherein the second filtering element is configured to filter a second signal of the first frequency band.

13. The foldable terminal device of claim 12, wherein the foldable terminal device further comprises a second tuning element electrically connected to the first antenna element, and wherein the second tuning element is configured to adjust the second frequency band.

14. The foldable terminal device of claim 1, wherein the foldable terminal device further comprises a third feed source, a first filtering element, and a second filtering element, wherein the second antenna element is configured to be fed by the third feed source and operate on a second frequency band, wherein the first filtering element is electrically connected between a ground and the second antenna element, wherein the first filtering element is configured to filter a first signal of the second frequency band, wherein the second filtering element is electrically connected between the third feed source and the second antenna element, and wherein the second filtering element is configured to filter a second signal of the first frequency band.

15. The foldable terminal device of claim 14, wherein the foldable terminal device further comprises a first tuning element, wherein the first tuning element is electrically connected to the second antenna element, and wherein the first tuning element is configured to adjust the second frequency band.

16. The foldable terminal device of claim 1, wherein when the foldable terminal device is unfolded, the first antenna element is configured to be fed by the first feed source and operate on the first frequency band, and the second antenna element does not operate.

17. The foldable terminal device of claim 1, wherein when the foldable terminal device is unfolded, the first antenna element is configured to be fed by the first feed source and operate on the first frequency band, and the second antenna element is configured to operate on another frequency band different from the first frequency band.

18. The foldable terminal device of claim 1, wherein an operating frequency band of the first antenna element comprises a near-field communication (NFC) antenna operating frequency band.

19. The foldable terminal device of claim 1, wherein an operating frequency band of the first antenna element comprises a WI-FI antenna operating frequency band.

20. The foldable terminal device of claim 1, wherein an operating frequency band of the first antenna element comprises a cellular antenna operating frequency band.

* * * * *